(12) United States Patent
Yallen et al.

(10) Patent No.: US 12,299,085 B2
(45) Date of Patent: May 13, 2025

(54) NON-FUNGIBLE TOKEN MINTING IN A METAVERSE ENVIRONMENT

(71) Applicant: Metatope LLC, Woodland Hills, CA (US)

(72) Inventors: Jordan Yallen, Los Angeles, CA (US); Walker Holmes, Indialantic, FL (US); Joseph Poulose, Woodland Hills, CA (US)

(73) Assignee: Metatope LLC, Woodland Hills, CA (US)

( * ) Notice: Subject to any disclaimer, the term of this patent is extended or adjusted under 35 U.S.C. 154(b) by 230 days.

(21) Appl. No.: 18/193,280

(22) Filed: Mar. 30, 2023

(65) Prior Publication Data

US 2023/0319373 A1 Oct. 5, 2023

Related U.S. Application Data

(60) Provisional application No. 63/382,314, filed on Nov. 4, 2022, provisional application No. 63/369,735, filed (Continued)

(51) Int. Cl.
*H04N 21/84* (2011.01)
*G06F 21/10* (2013.01)
(Continued)

(52) U.S. Cl.
CPC .............. *G06F 21/10* (2013.01); *G06T 13/40* (2013.01); *G06T 17/00* (2013.01); *G06V 40/171* (2022.01);
(Continued)

(58) Field of Classification Search
None
See application file for complete search history.

(56) References Cited

U.S. PATENT DOCUMENTS

2006/0235790 A1 10/2006 Jung et al.
2009/0177977 A1 7/2009 Jones et al.
(Continued)

OTHER PUBLICATIONS

International Search Report and Written Opinion for Application No. PCT/US2023/65161, mailed on Jun. 28, 2023, 10 pages.
(Continued)

*Primary Examiner* — Cai Y Chen
(74) *Attorney, Agent, or Firm* — DLA PIPER LLP (US)

(57) ABSTRACT

A system includes a metaverse server configured to host a metaverse environment configured to facilitate digital interactions. The metaverse server is configured to host, within the metaverse environment, digital content generated by a creator. The digital content includes image data, text data, audio data, and/or video data. The digital content includes a non-fungible token associated therewith. The metaverse server is further configured to monitor interactions within the metaverse environment with the digital content. The interactions include one or more of a like, share, or comment associated with the digital content. The metaverse server is further configured to, responsive to detecting an interaction with the digital content within the metaverse environment, index the interaction by associating the interaction with the digital content. Transfer of the digital content to another user includes the transfer of the indexed interaction.

20 Claims, 11 Drawing Sheets

Related U.S. Application Data on Jul. 28, 2022, provisional application No. 63/369,734, filed on Jul. 28, 2022, provisional application No. 63/362,860, filed on Apr. 12, 2022, provisional application No. 63/362,179, filed on Mar. 30, 2022.

(51) Int. Cl.
*G06T 13/40* (2011.01)
*G06T 17/00* (2006.01)
*G06V 40/16* (2022.01)
*H04N 21/8358* (2011.01)

(52) U.S. Cl.
CPC ......... *H04N 21/8358* (2013.01); *H04N 21/84* (2013.01); *G06F 21/1014* (2023.08)

(56) References Cited

U.S. PATENT DOCUMENTS

| | | |
|---|---|---|
| 2010/0228633 A1 | 9/2010 | Guimaraes et al. |
| 2012/0266256 A1 | 10/2012 | Kawachiya et al. |
| 2019/0035149 A1* | 1/2019 | Chen .................... G06V 40/166 |
| 2020/0234481 A1 | 7/2020 | Scapel et al. |
| 2021/0256070 A1 | 8/2021 | Tran et al. |
| 2021/0279695 A1 | 9/2021 | Rice |

OTHER PUBLICATIONS

Moreno I., et al., "Marker-Less Feature and Gesture Detection for an Interactive Mixed Reality Avatar," Sep. 2015, 12 pages, [retrieved on May 23, 2023], Retrieved from the Internet URL: https://ieeexplore.ieee.org/abstract/document/7330433.

DeepMotion, "DeepMotion: Animate 3D | Markerless Face Tracking | V3.0 Release," Jul. 1, 2021, YouTube Video, pp. 1-11, https://www.youtube.com/watch?v=PGjqa3O6o1k.

International Search Report and Written Opinion for Application No. PCT/US2023/65160, mailed on Jul. 12, 2023, 8 pages.

Wang, et al., "Non-fungible token (NFT): Overview, evaluation, opportunities and challenges," arXiv preprint arXiv:2105.07447, 2021, 1-22 pages.

\* cited by examiner

NON-FUNGIBLE TOKEN MINTING IN A METAVERSE ENVIRONMENT

CROSS-REFERENCE TO RELATED APPLICATIONS

This application claims priority to U.S. Provisional Application No. 63/362,179, filed Mar. 30, 2022, U.S. Provisional Application No. 63/369,734, filed Jul. 28, 2022, U.S. Provisional Application No. 63/362,860 filed Apr. 12, 2022, U.S. Provisional Application No. 63/369,735, filed Jul. 28, 2022, and U.S. Provisional Application No. 63/382,314, filed Nov. 4, 2022, all of which are hereby incorporated by reference in their entireties.

FIELD OF THE DISCLOSURE

Embodiments disclosed herein generally related to a metaverse environment.

BACKGROUND

Recently, non-fungible tokens have become a popular means for content creators to protect their content. For example, users are able to use a variety of platforms to tokenize their content, such that they retain ownership over that content. With the tokenized version of their content, the content creator can profit off their content by transferring the tokenized version of their content to other users.

SUMMARY

In some embodiments, a system is disclosed herein. The system includes a metaverse server configured to host a metaverse environment configured to facilitate digital interactions. The metaverse server is in communication with a storage location, a content creator device, and a user device. The metaverse server is configured to host, within the metaverse environment, digital content generated by a creator. The digital content includes image data, text data, audio data, and/or video data. The digital content includes a non-fungible token associated therewith. The metaverse server is further configured to monitor interactions within the metaverse environment with the digital content. The interactions include one or more of a like, share, or comment associated with the digital content. The metaverse server is further configured to, responsive to detecting an interaction with the digital content within the metaverse environment, index the interaction by associating the interaction with the digital content. Transfer of the digital content to another user includes the transfer of the indexed interaction.

In some embodiments, a method is disclosed herein. A computing system hosts, within a metaverse environment, digital content associated with a user. The digital content includes image data, text data, audio data, and/or video data. The digital content includes a non-fungible token associated therewith. The non-fungible token includes a link to a storage location storing the digital content and a metadata file associated with the digital content. The computing system monitors interactions within the metaverse environment with the digital content. The interactions include one or more of a like, share, or comment associated with the digital content. Responsive to detecting an interaction with the digital content within the metaverse environment, the computing system indexes the interaction by associating the interaction with the non-fungible token. Transfer of the non-fungible token to another user includes the transfer of the indexed interaction.

In some embodiments, a non-transitory computer readable medium is disclosed herein. The non-transitory computer readable medium includes one or more sequences of instructions, which, when executed by a processor, causes a computing system to perform operations. The operations include hosting, by the computing system within a metaverse environment, digital content associated with a user. The digital content includes image data, text data, audio data, and/or video data. The digital content includes a non-fungible token associated therewith. The non-fungible token includes a link to a storage location storing the digital content and a metadata file associated with the digital content. The operations further include monitoring, by the computing system, interactions within the metaverse environment with the digital content. The interactions include one or more of a like, share, or comment associated with the digital content. The operations further include, responsive to detecting an interaction with the digital content within the metaverse environment, indexing, by the computing system, the interaction by associating the interaction with the non-fungible token. Transfer of the digital content to another user includes the transfer of the indexed interaction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein provide a new non-fungible token platform that allows users to take ownership over the digital content that the user produces.

The term "user" as used herein includes, for example, a person or entity that owns a computing device or wireless device; a person or entity that operates or utilizes a computing device or wireless device; or a person or entity that is otherwise associated with a computing device or wireless device. It is contemplated that the term "user" is not intended to be limiting and may include various examples beyond those described.

The term "metaverse" as used herein may be representative of a centralized or decentralized environment that may be accessible to end users via one or more computing devices that include, but are not limited to, mobile devices, computing devices (e.g., tablets, laptops, personal computers, etc.), wearable devices, and extended reality (XR) devices (e.g., augmented reality devices, virtual reality device). Generally, the metaverse may refer to an environment that includes both real-world components and virtual components. In some embodiments, the metaverse may refer to a single metaverse environment. In some embodiments, the metaverse may refer to multiple metaverse environments, akin to a multiverse.

Figure 1:
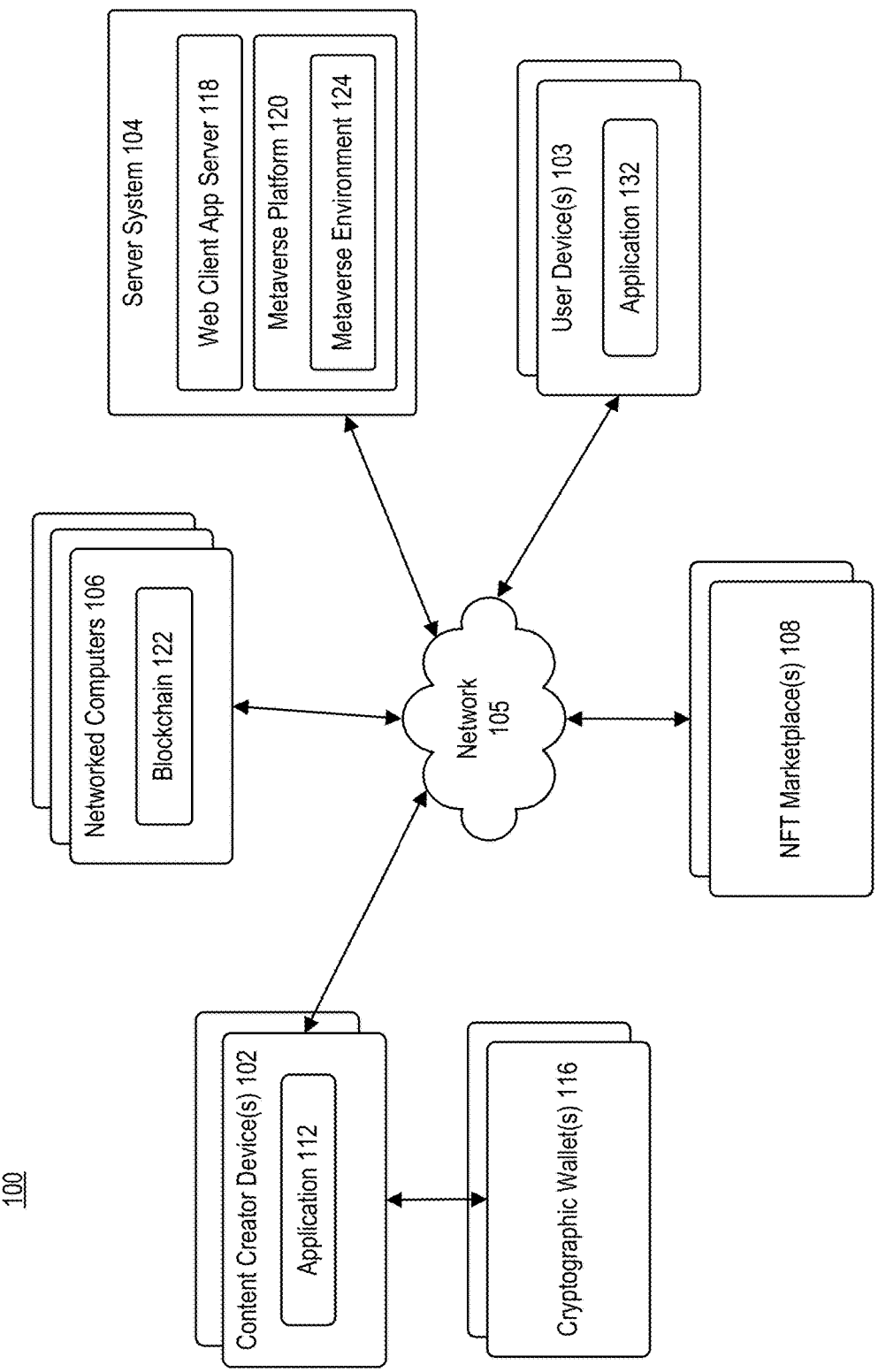
FIG. 1 is a block diagram illustrating a computing environment, according to one exemplary embodiment.

FIG. 1 is a block diagram illustrating computing environment 100, according to one embodiment. Computing environment 100 may include at least one or more content creator devices 102, one or more user devices 103, a server system 104, a blockchain 122, and one or more non-fungible token marketplaces 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

Content creator device 102 may be operated by user. Content creator device 102 may be representative of a mobile device, a tablet, a desktop computer, virtual reality (VR) system, augmented reality (AR) system, extended reality (XR) system, or any computing system having the capabilities described herein. Content creator device 102 may include at least application 112.

Application 112 may be associated with server system 104 through which a user may create and/or post digital content. In some embodiments, application 112 may be a standalone application associated with server system 104. In some embodiments, application 112 may be representative of a web-browser configured to communicate with server system 104. In some embodiments, content creator device 102 may communicate over network 105 to request a webpage, for example, from web client application server 118 of server system 104. For example, content creator device 102 may be configured to execute application 112 to enter a social media website or digital content website existing on the metaverse and hosted by web client application server 118. The content that is displayed to content creator device 102 may be transmitted from web client application server 118 to content creator device 102, and subsequently processed by application 112 for display through a graphical user interface (GUI) of content creator device 102.

As shown, in some embodiments, each content creator device 102 may be in communication with a respective cryptographic wallet 116. Cryptographic wallet 116 may be configured to store the user's fungible tokens (e.g., cryptocurrency) and non-fungible tokens in an encrypted manner. In some embodiments, cryptographic wallet 116 may be representative of a hot wallet (e.g., Coinbase, Metamask, etc.), which is a cryptographic wallet 116 connected to network 105. In some embodiments, cryptographic wallet 116 may be representative of a cold wallet (e.g., Ledger Nano X, Trezor Model T, and the like). In some embodiments, cryptographic wallet 116 may be incorporated within application 112. For example, rather than a user storing their fungible tokens and/or non-fungible tokens via a third party wallet, the user may leverage a cryptographic wallet associated with server system 104 via application 112.

User device 103 may be operated by user. User device 103 may be representative of a mobile device, a tablet, a desktop computer, virtual reality (VR) system, augmented reality (AR) system, extended reality (XR) system, or any computing system having the capabilities described herein. User device 103 may include at least application 132.

Application 132 may be representative of a content hosting application associated with server system 104. In some embodiments, application 132 may be a standalone application associated with server system 104. In some embodiments, application 132 may be representative of a web-browser configured to communicate with server system 104. In some embodiments, user device 103 may communicate over network 105 to request a webpage, for example, from web client application server 118 of server system 104. For example, user device 103 may be configured to execute application 132 to enter a digital content environment or social media website existing in a metaverse environment and hosted by web client application server 118. The content that is displayed to user device 103 may be transmitted from web client application server 118 to user device 103, and subsequently processed by application 132 for display through a graphical user interface (GUI) of user device 103.

Server system 104 may be configured to host a metaverse application accessible to content creator devices 102 and user devices 103. For example, server system 104 may include web client application server 118 and metaverse platform 120. Metaverse platform 120 may be configured to assist content creators in creating and/or hosting their digital content. Metaverse platform 120 may further be configured to facilitate digital interactions with the digital content. Metaverse platform 120 may be configured to host a simulated virtual environment in which users can post images or videos of their avatar within the simulated virtual environment. For example, metaverse platform 120 may allow users to take ownership over the social content that users produce whether they use these avatars or not.

In some embodiments, a user may access metaverse environment 124 using one or more third party authentication techniques. For example, a user may access metaverse environment 124 by using "Login with Ethereum virtual machine (EVM) compatible wallet" functionality, thus allowing the user to be verified using their EVM compatible accounts.

When a user creates digital content, in some embodiments, the digital content may be immediately represented as a non-fungible token through a process referred to as "post-to-mint." In some embodiments, initially, the non-fungible token is not minted onto blockchain 122 until a transaction takes place. A transaction may refer to a buying or selling of the non-fungible token corresponding to the user's post. Such process may provide users with a gasless mint process for the content creators, while also instantaneously allowing users to have a marketable product in the form of a non-fungible token.

The digital content may be displayed on the content creator's profile. In some embodiments, other users and/or community members can interact with the post on the content creator's profile. In some embodiments, interactions may come in the form of engagements or offers.

In some embodiments, metaverse platform 120 may support a "use-to-earn" model. For example, metaverse platform 120 may facilitate organic engagements (i.e., user interactions) to create activity and drive adoption of the platform. To do so, each post may be associated with a score. The score may be representative of a cumulative score of how many likes, shares, and other interactions a post receives. In some embodiments, certain activities will be rewarded with a higher score, ad points, and/or fungible tokens unique to metaverse platform 120 (e.g., "utility token"). In this manner, engagements such as likes, shares, views/plays, and comments can create a financial incentive for the end-user.

In some embodiments, the utility token may take the form of an ERC20 contract broadcast or written to blockchain 122. For example, the utility token may follow the Standard Openzeppelin Mintable ERC20 standard. The utility tokens may initially be held by an entity associated with server system 104. For example, the ERC20 contracts may be deployed from and owned by the entity using a Gnosis Multisig wallet, thus allowing administrators to retain control over the tokens until transferred to a user.

In some embodiments, metaverse platform 120 may function as a social media and/or content creation platform in which a user's digital content can be represented by non-fungible tokens. For example, upon posting image content, video content, or audio content to metaverse platform 120, metaverse platform 120 may mint a non-fungible token to tokenize the image or video. In this manner, metaverse platform 120 can provide users with the ability to protect and market their content through non-fungible tokens.

Non-fungible token marketplaces 108 may be representative of one or more online marketplaces in which a user can upload or link their digital content. Via non-fungible token marketplaces 108 a user can buy, sell, or showcase their tokenized digital content. In some embodiments, non-fungible token marketplaces 108 may include centralized marketplaces (e.g., OpenSea) and/or decentralized marketplaces (e.g., LOOKSRARE). In some embodiments, any post within metaverse platform 120 that is also linked to a non-fungible token marketplace 108 may include a uniform resource locator or link that links back to the original post in metaverse platform 120.

Networked computers 106 may be configured to host blockchain 122. In some embodiments, blockchain 122 may be a public blockchain. In some embodiments, blockchain 122 may be a private blockchain, such as, for example, a private blockchain associated with server system 104. Generally, blockchain 122 may be representative of any blockchain configured to support non-fungible tokens. For example, blockchain 122 may be a public or private blockchain based on the Ethereum platform.

Figure 2:
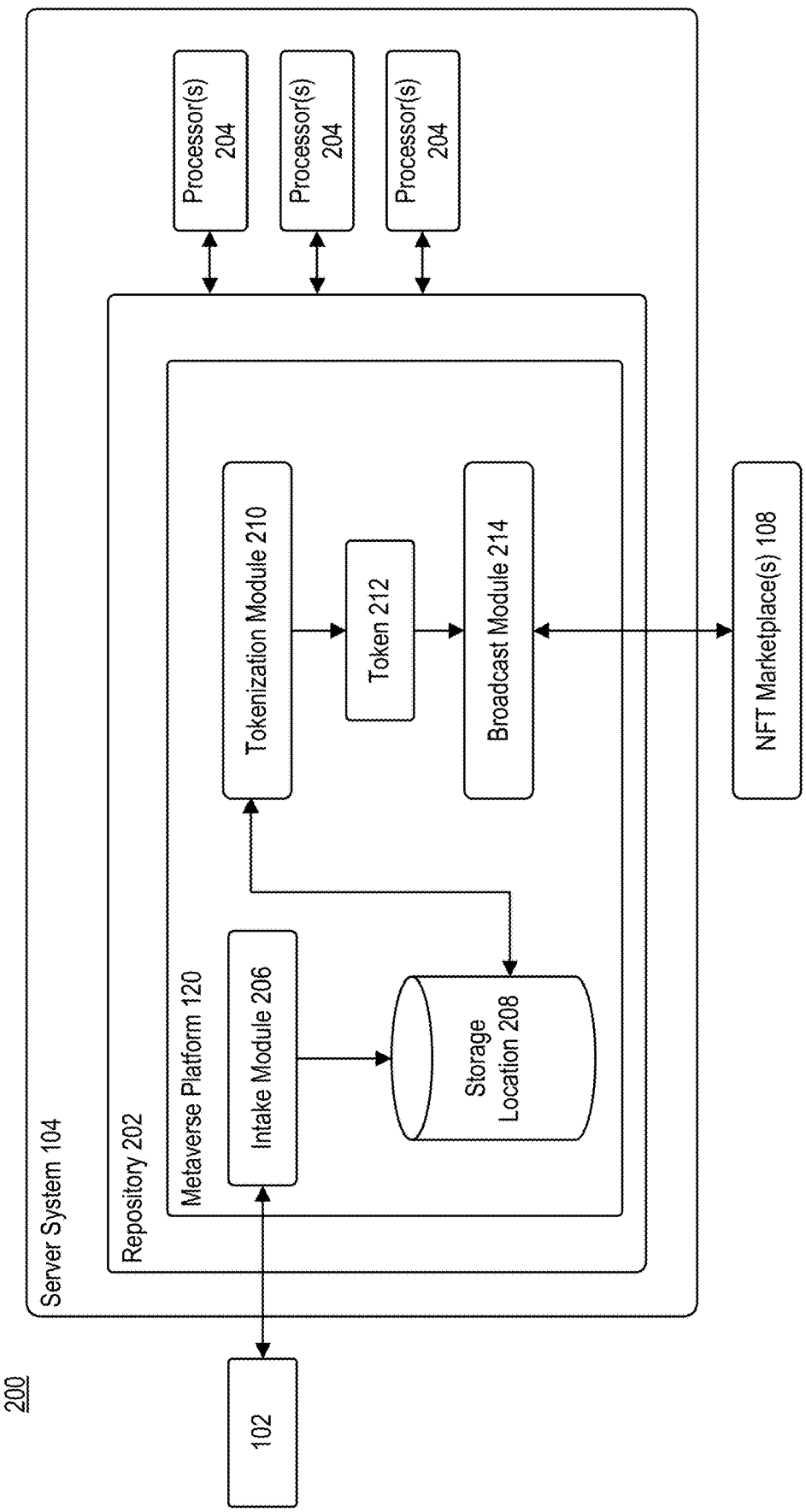
FIG. 2 is a block diagram illustrating server system of FIG. 1, according to example embodiments.

FIG. 2 is a block diagram 200 illustrating server system 104, according to example embodiments. As shown, server system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least metaverse platform 120.

Metaverse platform 120 may include an intake module 206, a tokenization module 210, and a broadcast module 214. Each of intake module 206, tokenization module 210, and broadcast module 214 may be comprised of one or more software modules. The one or more software modules are collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As shown, a content creator device 102 may upload or provide metaverse platform 120 with content. In some embodiments, the content may be representative of digital content (e.g., audio content, image content, and/or video content) generated by the user using content creator device 102. In some embodiments, the digital content can be a social media post. For example, the user can upload or provide a social media post to a social media environment accessible via metaverse platform 120. In some embodiments, other users may be able to interact with the social media post.

Intake module 206 may be configured to receive the content and metadata information corresponding to the content from content creator device 102. Upon receiving the content, intake module 206 may store the content at a network accessible location. For example, intake module 206 may store the content in storage location 208. Upon storing the content in storage location 208, intake module 206 may generate or receive a URL indicating the storage location of the content. Intake module 206 may provide the URL of the content to the user of content creator device 102.

The user may use the URL of the content to generate a metadata file corresponding to the content.

In some embodiments, the user may upload a metadata file corresponding to the content to intake module 206. The metadata file may define the traits for the content. In some embodiments, the metadata file may be representative of a JSON file to which the eventual non-fungible token will be linked. The metadata file may include, for example, the URI that identifies storage location 208 of the content. Intake module 206 may further store the metadata file corresponding to the content in storage location 208.

As indicated above, the content produced by the user includes the user's avatar token. In order to link the user's avatar token with the content, the metadata file may further include the URI corresponding to the tokenized avatar.

Tokenization module 210 may be configured to tokenize the content provided by the user (i.e., token 212). For example, tokenization module 210 may be configured to generate a smart contract based on the digital content. In some embodiments, the smart contract may be representative of an ERC721 contract. In some embodiments, the smart contract may be representative of an ERC1155 contract. The smart contract may include, for example, a URI corresponding to token 212, the URL that identifies a storage location of the content in storage location 208, and the URL that identifies a storage location of the metadata file corresponding to the content.

As those skilled in the art recognize, when a user mints a non-fungible token, the user typically has to pay a gas fee for the minting process to incentive miners to process and validate transaction on blockchain 122. The gas fee may disincentivize users from generating posts within the metaverse environment. Accordingly, to incentivize users to generate content within the metaverse environment, content posts may undergo a "gasless mint." In a gasless mint, tokenization module 210 may generate the ERC721 contract corresponding to the content; however, broadcast module 214 may not broadcast or write token 212 to blockchain 122 until another user interacts with the content. For example, if another user buys the content, such action may trigger the writing of token 212 to blockchain 122. In other words, token 212 may not be broadcast or written to blockchain 122 until another user buys token 212. In this manner, the burden of paying the gas fee may be transferred from the content creator to the buyer of the content.

Accordingly, once token 212 is generated, token 212 may be stored in storage location 208. Broadcast module 214 may be configured to broadcast or post the digital content to the user's account within the metaverse environment and/or one or more external non-fungible token marketplaces 108 (e.g., OpenSea).

As those skilled in the art understand, in some embodiments, the gasless minting process can be replaced with a direct minting process, whereby each digital content is instantly minted to blockchain 122 and the associated gas fee is paid by the content creator.

In some embodiments, as part of the token generation process, tokenization module 210 may generate a watermark (e.g., visible or non-visible watermark) that is unique to the social media post corresponding to token 212. In this manner, if another user attempts to screenshot or otherwise attempt to claim authorship or ownership of the social media post, the watermark can be used to indicate authenticity of the social media post.

In some embodiments, any of token 212 may be a "parent" token or a "child" token. For example, a parent token may have, stemming off of it, one or more child tokens. In some embodiments, a token may be a "child" token. For example, the token may be tethered to another parent token. In such embodiments, a child token may not be transferrable on its own without the parent token. Similarly, if a user owns a parent token, the user can claim the child token regardless of whether another person holds it. Such functionality may provide users with another set of security. For example, the user's parent token can be stored in a more secure vault (e.g., cold storage) while a child token tethered to the parent token remains in a hot storage wallet.

In some embodiments, once digital content is generated, a content creator may tag that post with a location such that other users may view the digital content, proximate the tagged location, in the metaverse environment. For example, a content creator may create digital content at City Hall and the content creator may tag City Hall as the location for the digital content. In this manner, when another user accesses metaverse environment 124 via user device 103, the user may view the digital content within metaverse environment 124 when approaching City Hall. For example, when as digital content is minted and tagged with a geolocation, other users may access an interactive map that details the location of digital contents within the metaverse environment. If, for example, a user accesses metaverse environment using an extended reality device, the user may be able to see the post in the physical world by using the extended reality software. Accordingly, when the user is near City Hall in the physical world, the post may be visible to the user via the extended reality software.

In some embodiments, such as when digital content includes the content creator and/or one or more other users, metaverse platform 120 may include facial recognition technology that can analyze the faces of the content creator and/or one or more other users in the digital content and tag the accounts of the corresponding users.

Figure 3:
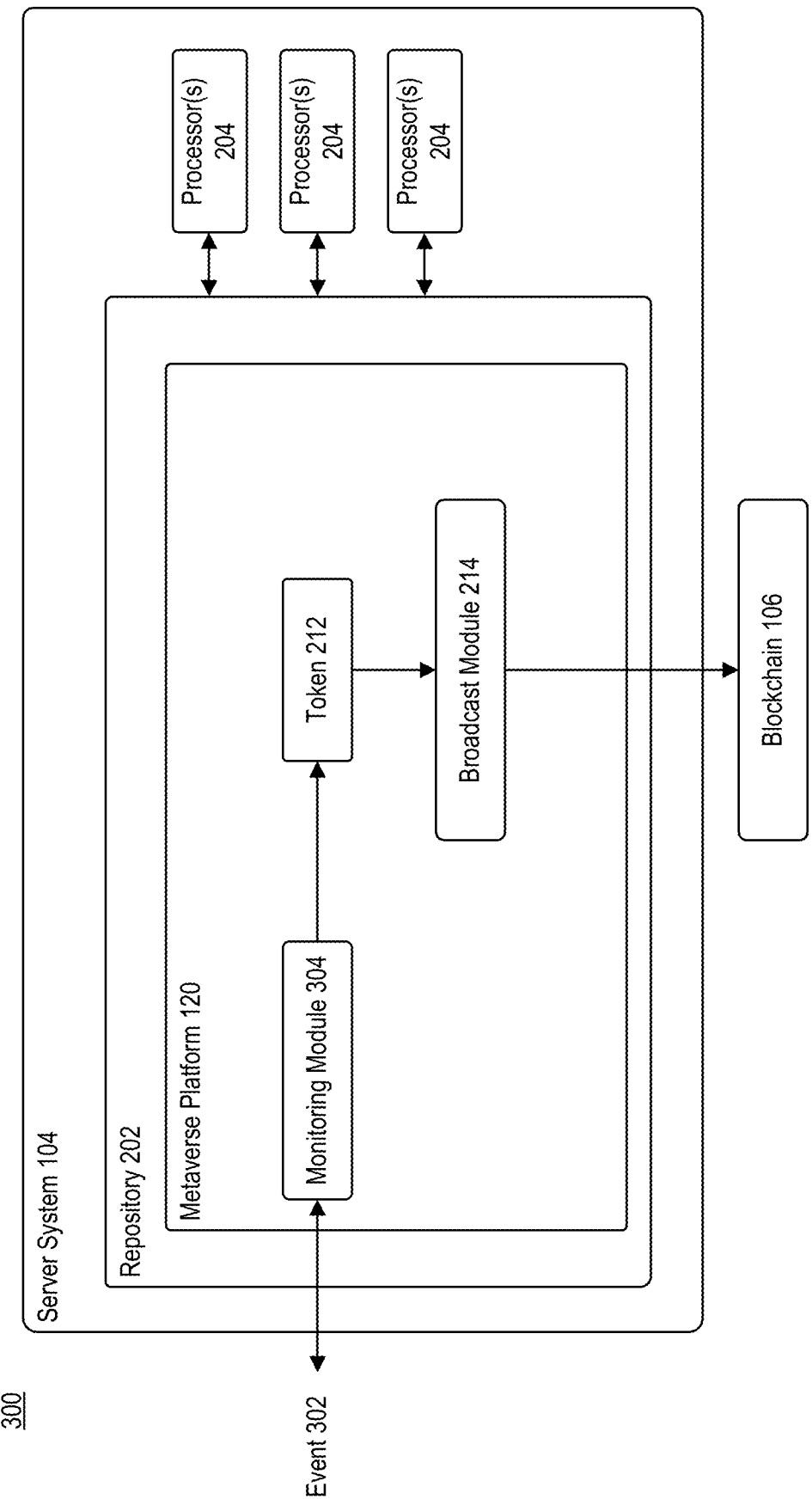
FIG. 3 is a block diagram illustrating server system of FIG. 1, according to example embodiments.

FIG. 3 is a block diagram 300 illustrating server system 104, according to example embodiments. As shown, block diagram 300 may illustrate components of server system 104 involved in monitoring digital content for a trigger event.

Monitoring module 304 may be configured to monitor a user's digital content to determine when a trigger event 302 occurs. As provided above, a trigger event may be associated with a buying, selling, or transferring of token 212 corresponding to the digital content. In some embodiments, monitoring module 304 may be configured to monitor the user's digital content within the metaverse environment. In some embodiments, monitoring module 304 may be configured to monitor the user's digital content in one or more non-fungible token marketplaces 108.

Responsive to identifying event 302, monitoring module 304 may retrieve the corresponding token 212 from storage location 208. Broadcast module 214 may then be configured to broadcast or write token 212 to blockchain 122. In some embodiments, broadcast module 214 may directly write token 212 to blockchain 122. For example, in some embodiments, broadcast module 214 may deploy token 212 on Ethereum Mainnet. Once deployed, token 212 may be bridged off Ethereum Mainnet to cheaper L2s. Such bridging may make it easier for users to interact directly from an L2.

Once the avatar image is minted, token 212 may be provided back to content creator device 102 for storage in the user's wallet 116. In some embodiments, token 212 may be temporarily held or controlled by an entity associated with server system 104. For example, token 212 may initially be deployed from and owned by the entity, thus allowing a development team to retain control until token 212 is transferred from a wallet associated with server system 104 (e.g., Gnosis Multisig) to a wallet 116 of the user. Once stored in the user's wallet 116, the user can transfer token 212 to the buyer.

Monitoring module 304 may further be configured to monitor a user's content to determine when to reward the user with a score or points contributing to the score. As referenced above, the user's content may be displayed on the content creator's profile within metaverse environment 124 and/or one or more non-fungible token marketplaces 108. Other users may interact with the user's content. Certain activities or interactions can be rewarded with a higher score, ad points, and/or utility tokens. Engagements such as likes, shares, views/plays, and comments can create a financial incentive for the user to create content.

In some embodiments, engagements with the user's content may be represented on the blockchain. For example, interactions with social content, such as, but not limited to, likes, shares, and views may be represented on the blockchain.

In some embodiments, the user's content (e.g., token 212) may be owned my multiple users. For example, shares of token 212 may be fractionalized, such that token 212 may have a plurality of owners. For example, user 1 owns a 30% share, user 2 owns a 50% share, and user 3 owns a 20% share. In this manner, any revenue garnered from token 212 (e.g., through interactions or engagements) may be distributed among the shareholders of token 212.

In some embodiments, monitoring module 304 may update the metadata associated with the user's content to reflect updated scores. For example, as recited above, the metadata file may include various attributes associated with the token to which the metadata is linked. In some embodiments, part of the attributes may include the score for the content. Monitoring module 304 may update the metadata file in storage location 208 without affecting the linked token.

Figure 4:
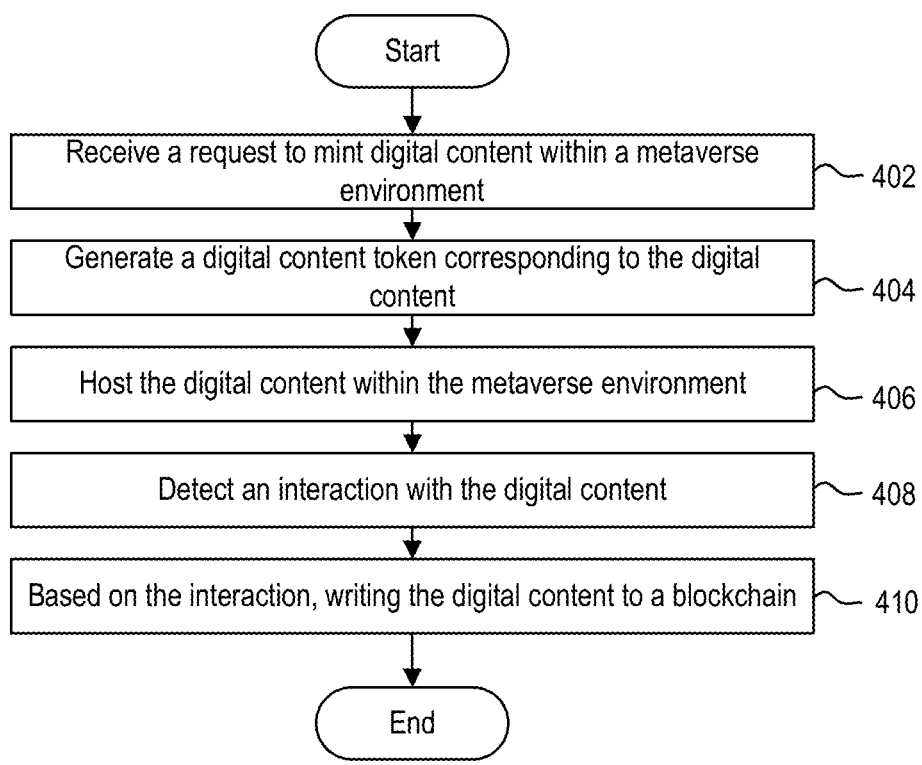
FIG. 4 is a flow diagram illustrating a method of minting digital content, according to example embodiments.

FIG. 4 is a flow diagram illustrating a method 400 of minting digital content, according to example embodiments. Method 400 may begin at step 402.

At step 402, metaverse platform 120 may receive a request to mint digital content within metaverse environment 124. For example, metaverse platform 120 may receive the content and metadata information corresponding to the content from content creator device 102. Upon receiving the content, metaverse platform 120 may store the content at a network accessible location. Upon storing the content in storage location 208, metaverse platform 120 may generate or receive a URL indicating the storage location of the content. Metaverse platform 120 may provide the URL of the content to the user of content creator device 102. The user may use the URL of the content to generate a metadata file corresponding to the content.

At step 404, metaverse platform 120 may generate a token corresponding to the digital content. For example, metaverse platform 120 may generate a smart contract based on the content and the avatar token. In some embodiments, the smart contract may be representative of an ERC721 contract. The smart contract may include, for example, a URI corresponding to token 212, the URL that identifies a storage location of the content in storage location 208, and the URL that identifies a storage location of the metadata file corresponding to the content.

At step 406, metaverse platform 120 may host the digital content within metaverse environment 124. In some embodiments, in addition to hosting the digital content within metaverse environment 124, metaverse platform 120 may further facilitate the hosting of the digital content via one or more applications (e.g., Facebook, Twitter, SoundCloud, Flickr, etc.) and/or non-fungible token marketplaces 108.

At step 408, metaverse platform 120 may detect an interaction with the digital content. As provided above, in some embodiments, a content creator's digital content token may not be written or broadcast to blockchain 122 until a user interacts (e.g., buys, sells, or transfers) with the digital content token. In other words, the tokenization referred above in step 404 may be a "gasless" mint. Accordingly, metaverse platform 120 may monitor the digital content to determine when a trigger occurs that warrants writing the digital content token to blockchain 122. In some embodiments, metaverse platform 120 may monitor the digital content within the metaverse environment 124. In some embodiments, metaverse platform 120 may monitor the digital content in one or more non-fungible token marketplaces 108.

At step 410, metaverse platform 120 may write the digital content token to blockchain 122 based on detecting the interaction. Responsive to identifying the interaction, metaverse platform 120 may retrieve the corresponding digital content token 212 from storage. Metaverse platform 120 may then broadcast or write the digital content token to blockchain 122. In some embodiments, metaverse platform 120 may directly write token 212 to blockchain 122.

Figures 5A, 5B:
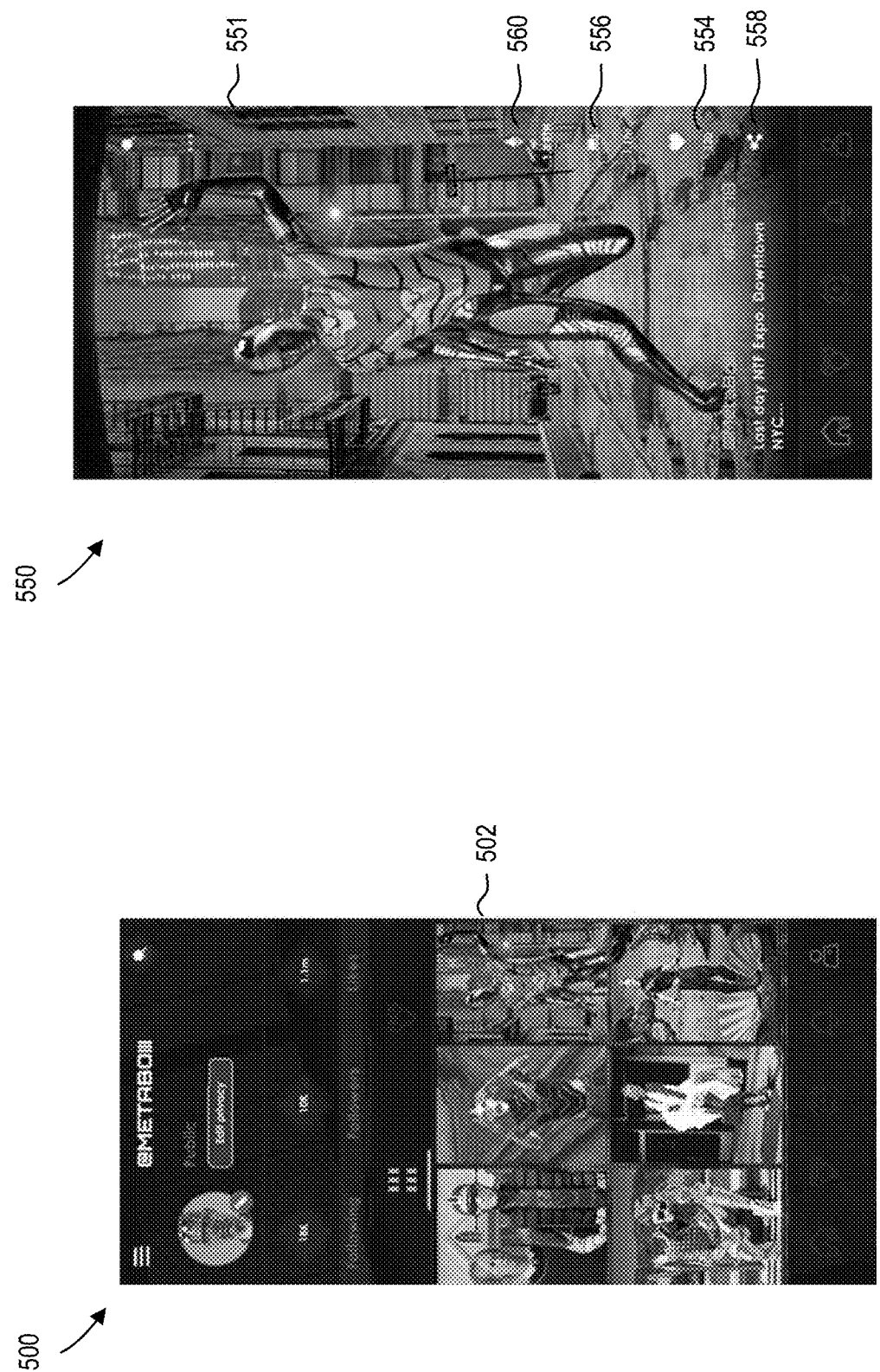
FIG. 5A illustrates an exemplary graphical user interface associated with metaverse platform, according to example embodiments.
FIG. 5B illustrates an exemplary graphical user interface associated with metaverse platform, according to example embodiments.

FIG. 5A illustrates an exemplary graphical user interface (GUI) 500 associated with metaverse platform 120, according to example embodiments. For example, GUI 500 may be displayed to the user via application 112 executing on content creator device 102 and/or application 132 executing on user device 103.

As shown, GUI 500 may be representative of a user's account with metaverse platform 120. The user's account illustrated via GUI 500 is @METABOIII. Via GUI 500, a user can view all of @METABOIII posts 502. Each post may represent a non-fungible token associated with @METABOIII account.

FIG. 5B illustrates an exemplary graphical user interface (GUI) 550 associated with metaverse platform 120, according to example embodiments. For example, GUI 550 may be displayed to the user via application 112 executing on content creator device 102 and/or application 132 executing on user device 103. GUI 550 may correspond to an interface responsive to the user selecting a post via GUI 500.

As shown, GUI 550 may illustrate a post 551. Via GUI 550, user's may be able to interact with post 551. For example, users may "like" or "heart" post 502, via graphical element 554. In another example, users may comment on post 551 via graphical element 556. In another example, users may share post 551 via graphical element 558. For example, a user can share post 551 with another user account within metaverse environment 124 or to another individual outside of metaverse environment 124 (e.g., someone that does not have an account in metaverse environment 124). In some embodiments, a user may further be able to purchase the post by interacting with graphical element 560. Graphical element 560 may provide the user with a link to marketplace where the corresponding token is posted for buying, bidding, or leasing.

Figure 6:
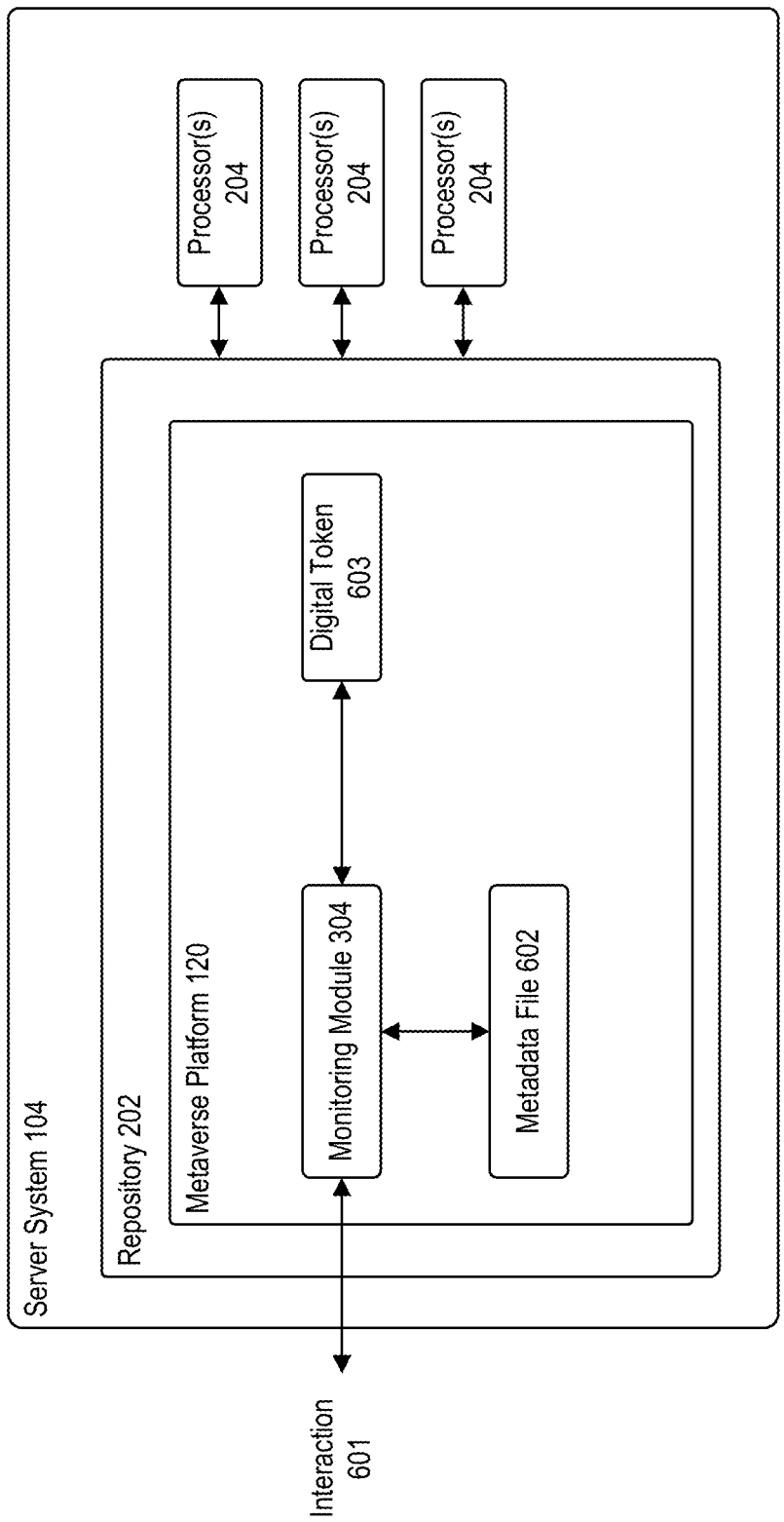
FIG. 6 is a block diagram illustrating server system, according to example embodiments.

FIG. 6 is a block diagram illustrating server system 104, according to example embodiments. As shown, block diagram may illustrate components of server system 104 involved in indexing events occurring within metaverse environment 124, according to example embodiments.

As shown, monitoring module 304 may be configured to monitor a user's digital content in order to index interactions 601 associated with the digital content. Example interactions 601 with a digital content may include, but are not limited to, liking, commenting, sharing, etc. the user's digital content. In some embodiments, monitoring module 304 may be configured to record each interaction 601 in association with a token 603 corresponding to the digital content. In some embodiments, recording each interaction 601 in association with a token corresponding to the digital content may include monitoring module 304 updating a metadata file 602 associated with token 603. For example, monitoring module 304 may update metadata file 602 stored in storage location 208. In some embodiments, recording each interaction 601 in association with a token corresponding to the digital content may including monitoring module 304 broadcasting interaction 601 to blockchain 122. Once broadcast, monitoring module 304 may create a link between token 603 and the record of interaction 601 on blockchain 122.

In some embodiments, monitoring module 304 may perform such indexing in real-time or near real-time on an interaction-by-interaction basis. In some embodiments, monitoring module 304 may perform batch processing of multiple interactions periodically throughout the day.

Such indexing may be useful, for example, when transferring ownership of token 603 between users. For example, assume that token 603 corresponds to a social media post that includes a thousand likes and a hundred comments. When an owner of token 603 transfers ownership of token 603 to a buyer, indexing of interactions may allow for the transfer of interactions 601 with token 603. Thus, all likes, comments, or other interactions stored in association with token 603 may be transferred to the buyer.

Figure 7A:
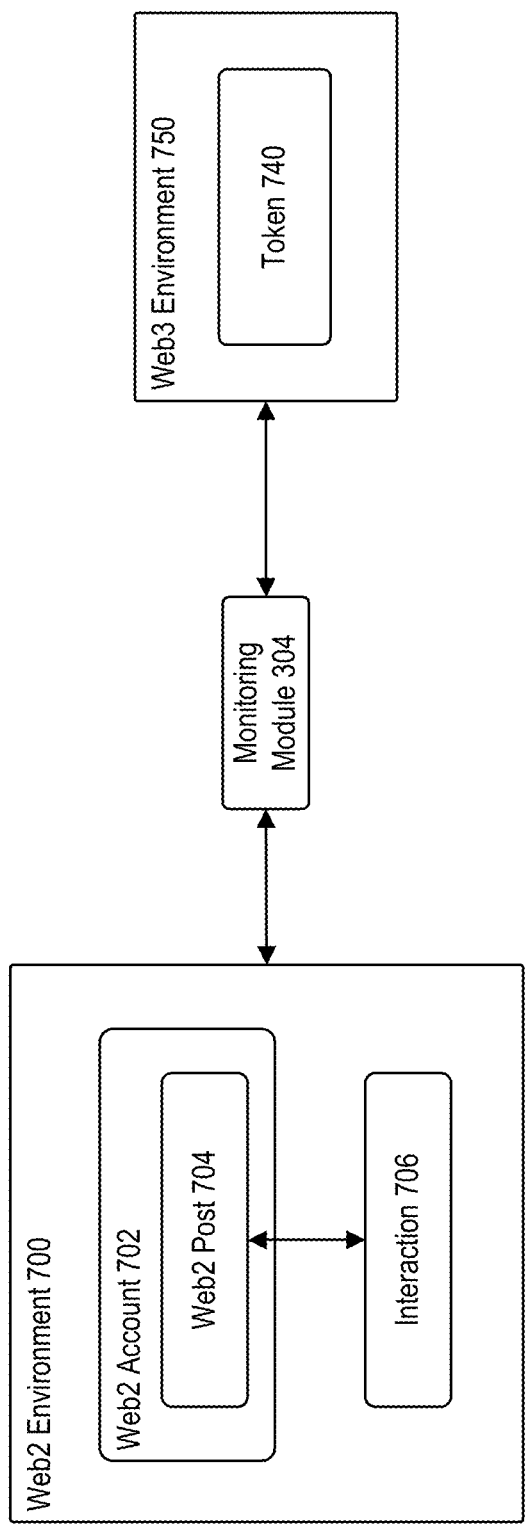
FIG. 7A is a block diagram illustrating interaction between a Web2 environment and a Web3 environment, according to example embodiments.

FIG. 7A is a block diagram illustrating interaction between a Web2 environment 700 and a Web3 environment 750, according to example embodiments. As shown, monitoring module 304 may sit logically between Web2 environment 700 and Web3 environment 750.

As discussed above, metaverse platform 120 may be configured to host metaverse environment 124 in which a user may generate social media posts and in which other users may interact with (e.g., comment, like, etc.) the generated social media posts. As those skilled in the art understand, a user of the metaverse environment may link their metaverse account (e.g., Web3 account) with their associated non-metaverse accounts (e.g., Web2 accounts). Example Web2 accounts may include, but are not limited to, Instagram, Twitter, TikTok, Facebook, SoundCloud, Medium, and the like. In some embodiments, a user's metaverse account may be linked to the user's non-metaverse account automatically. For example, a user's wallet address may be associated with both their metaverse account and non-metaverse account; thus, metaverse platform 120 may utilize the wallet address to identify other accounts associated with the user's wallet address that can be automatically linked with the user's metaverse account.

When such linkage occurs, monitoring module 304 may be configured to monitor the user's Web2 accounts (e.g., Web2 Account 702), such that monitoring module 304 may port over the user's Web2 posts and/or interactions. For example, upon a user linking their Instagram account with their metaverse account, monitoring module 304 may be configured to index and port over the user's Instagram posts. Using a more specific example, assume that a user has a post (e.g., Web2 post 704) in Instagram. Monitoring module 304 may identify Web2 post 704 and all of Web2 post's 704 interactions 706 (e.g., likes, comments, shares). Monitoring module 304 may cause metaverse platform 120 to generate a token 740 corresponding to the user's Instagram post, as discussed above in conjunction with FIGS. 2 and 4. Similar to the process discussed above, monitoring module 304 may store a representation of the user's Instagram post in storage location 208. Monitoring module 304 may then generate a token 740 based on the user's Instagram post. Such token 740 may thus exist as a social media post in metaverse environment 124.

In some embodiments, monitoring module 304 may further index each interaction 706 associated with the Instagram post. For example, monitoring module 304 may be configured to identify and save each interaction 706 in association with token 740. In some embodiments, such process may include monitoring module 304 updating a metadata file associated with token 740 (e.g., stored in storage location 208) to include each interaction. In some embodiments, such process may include monitoring module 304 creating an immutable record of each interaction 706 on blockchain 122 and linking or otherwise associating the immutable record stored on the blockchain with token 740. In such embodiments, monitoring module 304 may effectively port over Web2 post's 704 interactions 706 from Web2 environment 700 to Web3 environment 750.

In some embodiments, monitoring module 304 may be further configured to continually or periodically monitor Web2 post 704 to continue the indexing process. For example, monitoring module 304 may continually or periodically Web2 post 704 to update token's 740 metadata file with new interactions. In this manner, any interaction with Web2 post 704 may be indexed in storage location 208 such that the user may be credited with those interactions in the Web3 version of the social media post.

Figure 7B:
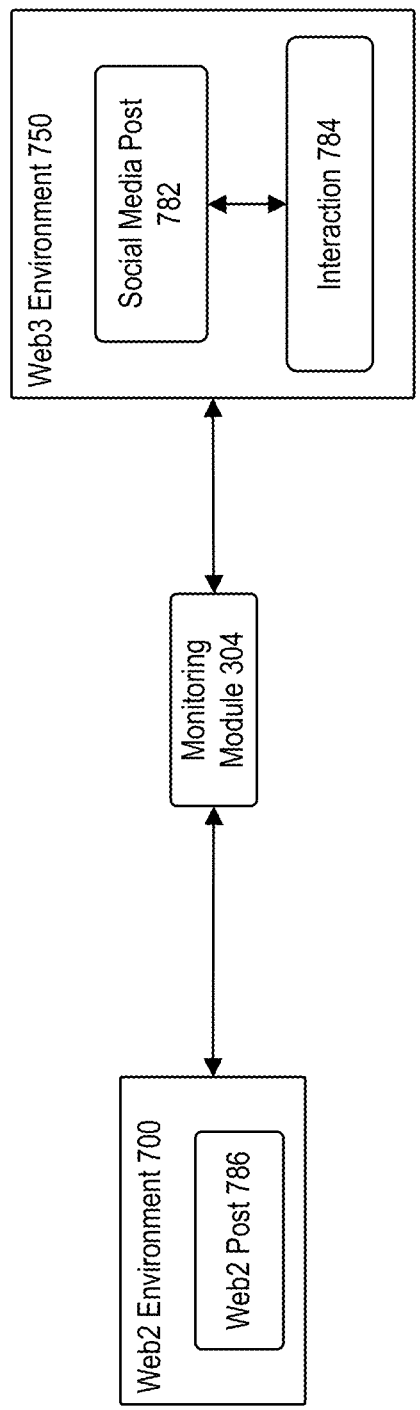
FIG. 7B is a block diagram illustrating interaction between a Web2 environment and a Web3 environment, according to example embodiments.

FIG. 7B is a block diagram illustrating interaction between a Web2 environment 700 and a Web3 environment 750, according to example embodiments. Similar to the process discussed above in conjunction with FIG. 7A, monitoring module 304 may further be configured to monitor a user's Web3 posts, such that monitoring module 304 may index and port over the user's Web3 posts and/or interactions into Web2 environment 700. For example, as shown, a user may create a social media post 782 in Web3 environment 750. As discussed above in conjunction with FIGS. 2 and 4, metaverse platform 120 may generate a token (e.g., token 212) associated with social media post 782. Similarly, as discussed above in conjunction with FIG. 6, monitoring module 304 may monitor social media post 782 to index interactions 784 with social media post 782.

In some embodiments, upon a user linking their Web2 account with their Web3 account, monitoring module 304 may also be configured to port over the user's Web3 posts (e.g., social media post 782) into Web2 environment 700. Continuing with the above example, monitoring module 304 may identify social media post 782 and interactions 784 (e.g., likes, comments, shares). Monitoring module 304 may generate a Web2 post 786 corresponding to social media post 782 and may cause Web2 post 786 to exist in Web2 environment 700. In some embodiments, monitoring module 304 may further cause Web2 environment 700 to port over interactions 784 into its Web2 environment.

In this manner, monitoring module 304 may facilitate seamless integration between social media posts existing in Web2 environment 700 and social media posts existing in Web3 environment 750.

Figure 8A:
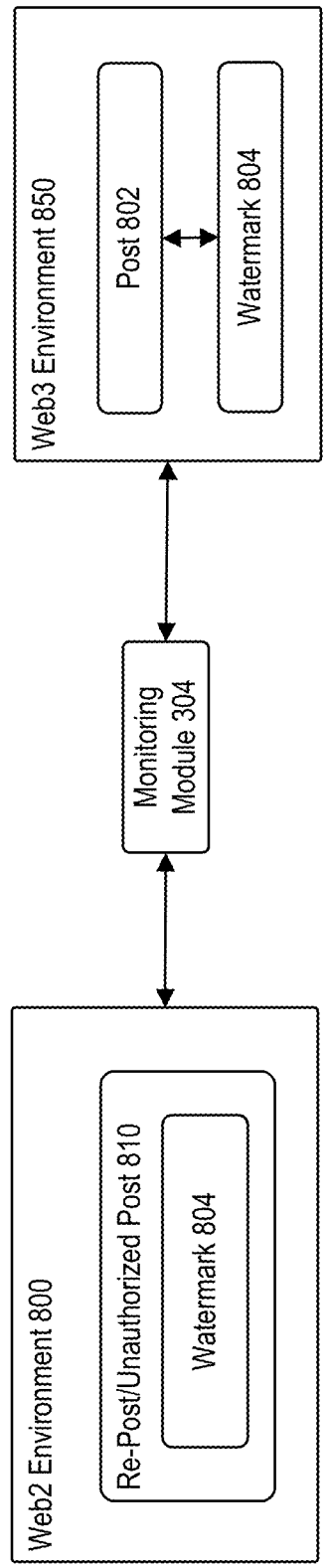
FIG. 8A is a block diagram illustrating a computing environment, according to example embodiments.

FIG. 8A is a block diagram illustrating a computing environment 800, according to example embodiments. As shown, computing environment 800 may include a Web2 environment 800 and a Web3 environment 850, according to example embodiments. As shown, monitoring module 304 may sit logically between Web2 environment 800 and Web3 environment 850.

Web3 environment 850 may include a post 802 generated by a user in metaverse environment 124. In some embodiments, post 802 may include a Web2 counterpart existing in Web2 environment 800. As discussed above in conjunction with FIG. 2, when a user goes through the process of tokenizing a social media post, metaverse platform 120 may create a watermark to include in the social media post. As shown, post 802 may include associated watermark 804. In this manner, unauthorized uses of the social media post can be tracked. Monitoring module 304 may be configured to scour or scan Web3 environment 850 and Web2 environment 800 to identify any posts that include the watermark unique to post 802. If, for example, monitoring module 304 identifies a re-post or unauthorized post 810 that includes watermark 804, monitoring module 304 may attribute any interactions with the re-post or unauthorized post 810 back to post 802, similar to the indexing process discussed above in conjunction with FIGS. 6-7B. In some embodiments, monitoring module 304 may notify owner of post 802 of the re-post or unauthorized use. Such process may allow the post originator to obtain credit for both authorized and unauthorized uses of its posts. Such functionality may be particular useful, for example, in the advertising context, where post owners can be financially compensated for their content.

In some embodiments, responsive to detecting unauthorized post 810, monitoring module 304 may be configured to send an alert to an owner of unauthorized post 810 notifying the owner of their unauthorized use. For example, monitoring module 304 may send a pre-set cease and desist notification to the owner of unauthorized post 810.

Figure 8B:
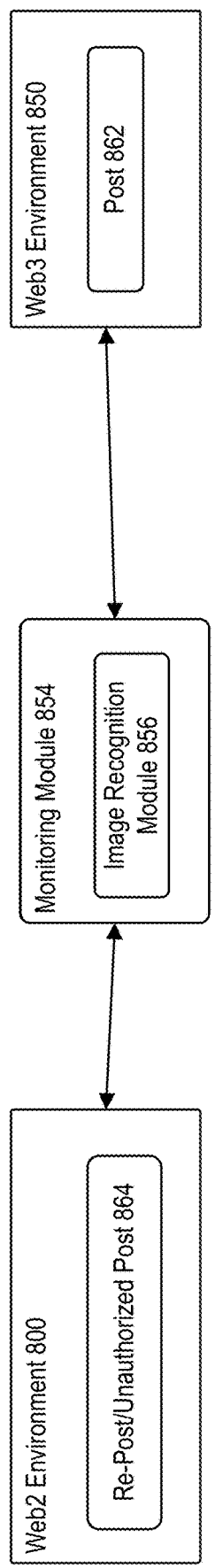
FIG. 8B is a block diagram illustrating a computing environment, according to example embodiments.

FIG. 8B is a block diagram illustrating a computing environment 800, according to example embodiments. As shown, computing environment 800 may include a Web2 environment 800 and a Web3 environment 850, according to example embodiments. As shown, monitoring module 854 may sit logically between Web2 environment 800 and Web3 environment 850.

Web3 environment 850 may include a post 862 generated by a user in metaverse environment 124. In some embodiments, post 862 may include a Web2 counterpart existing in Web2 environment 800. Rather than utilize the watermarking approach discussed above in conjunction with FIG. 2 and FIG. 8A, in some embodiments, monitoring module 854 may include an image recognition module 856. Image recognition module 856 may be representative of one or more computer vision or artificial intelligence techniques for identifying reposts or unauthorized posts of post 862. In this manner, unauthorized uses of the social media post can be tracked using computer vision and/or artificial intelligence technology. For example, monitoring module 854 may be configured to scour or scan Web3 environment 850 and Web2 environment 800 to identify any posts that may be similar to or derivatives of post 862. If, for example, monitoring module 304 identifies a re-post or unauthorized post 810 that is similar to or a derivative of post 862, monitoring module 304 may attribute any interactions with the re-post or unauthorized post 864 back to post 862, similar to the indexing process discussed above in conjunction with FIGS. 6-7B.

Figure 9A:
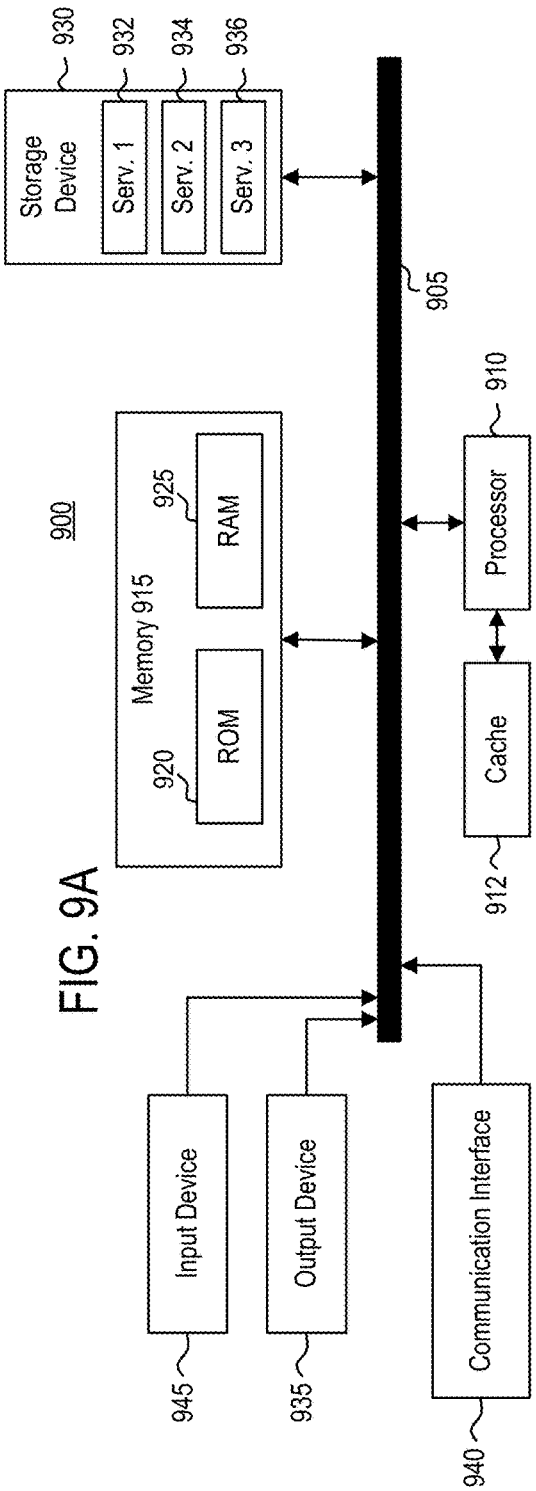
FIG. 9A illustrates a system bus computing system architecture, according to example embodiments.

FIG. 9A illustrates an architecture of system bus computing system 900, according to example embodiments. One or more components of system 900 may be in electrical communication with each other using a bus 905. System 900 may include a processor (e.g., one or more CPUs, GPUs or other types of processors) 910 and a system bus 905 that couples various system components including the system memory 915, such as read only memory (ROM) 920 and random access memory (RAM) 925, to processor 910. System 900 can include a cache of high-speed memory connected directly with, in close proximity to, or integrated as part of processor 910. System 900 can copy data from memory 915 and/or storage device 930 to cache 912 for quick access by processor 910. In this way, cache 912 may provide a performance boost that avoids processor 910 delays while waiting for data. These and other modules can control or be configured to control processor 910 to perform various actions. Other system memory 915 may be available for use as well. Memory 915 may include multiple different types of memory with different performance characteristics. Processor 910 may be representative of a single processor or multiple processors. Processor 910 can include one or more of a general purpose processor or a hardware module or software module, such as service 1 932, service 2 934, and service 3 936 stored in storage device 930, configured to control processor 910, as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction with the system 900, an input device 945 can be any number of input mechanisms, such as a microphone for speech, a touch-sensitive screen for gesture or graphical input, keyboard, mouse, motion input, speech and so forth. An output device 935 (e.g., a display) can also be one or more of a number of output mechanisms known to those of skill in the art. In some instances, multimodal systems can enable a user to provide multiple types of input to communicate with system 900. Communication interface 940 can generally govern and manage the user input and system output. There is no restriction on operating on any particular hardware arrangement and therefore the basic features here may easily be substituted for improved hardware or firmware arrangements as they are developed.

Storage device 930 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 925, read only memory (ROM) 920, and hybrids thereof.

Storage device 930 can include services 932, 934, and 936 for controlling the processor 910. Other hardware or software modules are contemplated. Storage device 930 can be connected to system bus 905. In one aspect, a hardware module that performs a particular function can include the software component stored in a computer-readable medium in connection with the necessary hardware components, such as processor 910, bus 905, output device 935 (e.g., a display), and so forth, to carry out the function.

Figure 9B:
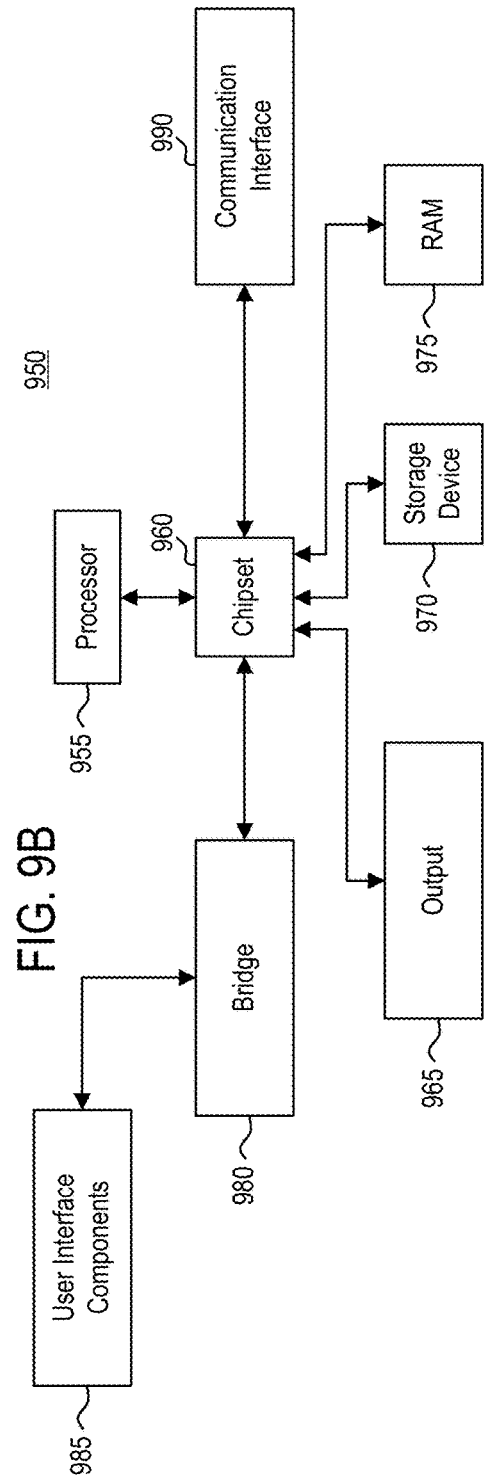
FIG. 9B illustrates a computer system having a chipset architecture, according to example embodiments.

FIG. 9B illustrates a computer system 950 having a chipset architecture, according to example embodiments. Computer system 950 may be an example of computer hardware, software, and firmware that can be used to implement the disclosed technology. System 950 can include one or more processors 955, representative of any number of physically and/or logically distinct resources capable of executing software, firmware, and hardware configured to perform identified computations. One or more processors 955 can communicate with a chipset 960 that can control input to and output from one or more processors 955. In this example, chipset 960 outputs information to output 965, such as a display, and can read and write information to storage device 970, which can include magnetic media, and solid-state media, for example. Chipset 960 can also read data from and write data to storage device 975 (e.g., RAM). A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 955 analyzing data stored in storage device 970 or 975. Further, the machine can receive inputs from a user through user interface components 985 and execute appropriate functions, such as browsing functions by interpreting these inputs using one or more processors 955.

It can be appreciated that example systems 900 and 950 can have more than one processor 910 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A system, comprising:
 a metaverse server configured to host a metaverse environment configured to facilitate digital interactions, the metaverse server in communication with a storage location, a content creator device, and a user device, the metaverse server configured to:
  host, within the metaverse environment, digital content generated by a creator, the digital content comprising image data, text data, audio data, and/or video data, wherein the digital content comprises a non-fungible token associated therewith;
  monitor interactions within the metaverse environment with the digital content, the interactions comprising one or more of a like, share, or comment associated with the digital content; and
  responsive to detecting an interaction with the digital content within the metaverse environment, index the interaction by associating the interaction with the digital content, wherein transfer of the digital content to another user comprises the transfer of the indexed interaction.

2. The system of claim 1, wherein associating the interaction with the digital content comprises one of:
 updating a metadata file associated with the digital content; or
 generating an immutable record of the interaction and associating the immutable record with the non-fungible token.

3. The system of claim 2, wherein the metaverse server is further configured to:
 store, in the metadata file, traits for the image data, text data, audio data, and/or video data associated with the digital content.

4. The system of claim 1, wherein the metaverse server is further configured to:
 generate a watermark to be included in the digital content, wherein the watermark uniquely represents the digital content.

5. The system of claim 4, wherein the metaverse server is further configured to:
 scan the metaverse environment to identify other digital content that comprises the watermark; and
 responsive to identifying other digital content that comprises the watermark, indexing other interactions associated with the digital content, wherein indexing the other interactions comprises attributing the other interactions to the digital content of the creator.

6. The system of claim 1, wherein the metaverse server is further configured to:
 identify a Web2 account associated with the creator in a Web2 environment;
 index other social media posts of the creator in the Web2 environment; and
 port the other social media posts of the creator in the Web2 environment into the metaverse environment.

7. The system of claim 6, wherein the metaverse server is further configured to:
 port the digital content of the creator in the metaverse environment into the Web2 account associated with the creator in the Web2 environment.

8. A method, comprising:
 hosting, by a computing system within a metaverse environment, digital content associated with a user, the digital content comprising image data, text data, audio data, and/or video data, wherein the digital content comprises a non-fungible token associated therewith, wherein the non-fungible token comprises a link to a storage location storing the digital content and a metadata file associated with the digital content;

monitoring, by the computing system, interactions within the metaverse environment with the digital content, the interactions comprising one or more of a like, share, or comment associated with the digital content; and responsive to detecting an interaction with the digital content within the metaverse environment, indexing, by the computing system, the interaction by associating the interaction with the non-fungible token, wherein transfer of the non-fungible token to another user comprises the transfer of the indexed interaction.

9. The method of claim 8, wherein associating the interaction with the digital content comprises one of:

updating the metadata file associated with the digital content; or generating an immutable record of the interaction and associating the immutable record with the non-fungible token.

10. The method of claim 8, further comprising:

storing, by the computing system, in the metadata file, traits for the image data, text data, audio data, and/or video data associated with the digital content.

11. The method of claim 8, further comprising:

generating, by the computing system a watermark to be included in the digital content, wherein the watermark uniquely represents the digital content.

12. The method of claim 11, further comprising:

scanning, by the computing system, the metaverse environment to identify other digital content that comprises the watermark; and responsive to identifying other digital content that comprises the watermark, indexing, by the computing system, other interactions associated with the digital content, wherein indexing the other interactions comprises attributing the other interactions to the digital content of the user.

13. The method of claim 8, further comprising:

identifying, by the computing system, a Web2 account associated with the user in a Web2 environment;

indexing, by the computing system, other social media posts of the user in the Web2 environment; and porting, by the computing system, the other social media posts of the user in the Web2 environment into the metaverse environment.

14. The method of claim 13, further comprising:

porting, by the computing system, the digital content of the user in the metaverse environment into the Web2 account associated with the user in the Web2 environment.

15. A non-transitory computer readable medium comprising one or more sequences of instructions, which, when executed by a processor, causes a computing system to perform operations comprising:

hosting, by the computing system within a metaverse environment, digital content associated with a user, the digital content comprising image data, text data, audio data, and/or video data, wherein the digital content comprises a non-fungible token associated therewith, wherein the non-fungible token comprises a link to a storage location storing the digital content and a metadata file associated with the digital content;

monitoring, by the computing system, interactions within the metaverse environment with the digital content, the interactions comprising one or more of a like, share, or comment associated with the digital content; and responsive to detecting an interaction with the digital content within the metaverse environment, indexing, by the computing system, the interaction by associating the interaction with the non-fungible token, wherein transfer of the digital content to another user comprises the transfer of the indexed interaction.

16. The non-transitory computer readable medium of claim 15, further comprising:

storing, by the computing system, in the metadata file, traits for the image data, text data, audio data, and/or video data associated with the digital content.

17. The non-transitory computer readable medium of claim 15, further comprising:

generating, by the computing system a watermark to be included in the digital content, wherein the watermark uniquely represents the digital content.

18. The non-transitory computer readable medium of claim 17, further comprising:

scanning, by the computing system, the metaverse environment to identify other digital content that comprises the watermark; and responsive to identifying other digital content that comprises the watermark, indexing, by the computing system, other interactions associated with the digital content, wherein indexing the other interactions comprises attributing the other interactions to the digital content of the user.

19. The non-transitory computer readable medium of claim 15, further comprising:

identifying, by the computing system, a Web2 account associated with the user in a Web2 environment;

indexing, by the computing system, other social media posts of the user in the Web2 environment; and porting, by the computing system, the other social media posts of the user in the Web2 environment into the metaverse environment.

20. The non-transitory computer readable medium of claim 19, further comprising:

porting, by the computing system, the digital content of the user in the metaverse environment into the Web2 account associated with the user in the Web2 environment.

* * * * *